Dec. 12, 1944.  W. H. HENDEL  2,364,977
MACHINE TOOL
Filed Sept. 25, 1942    3 Sheets-Sheet 1
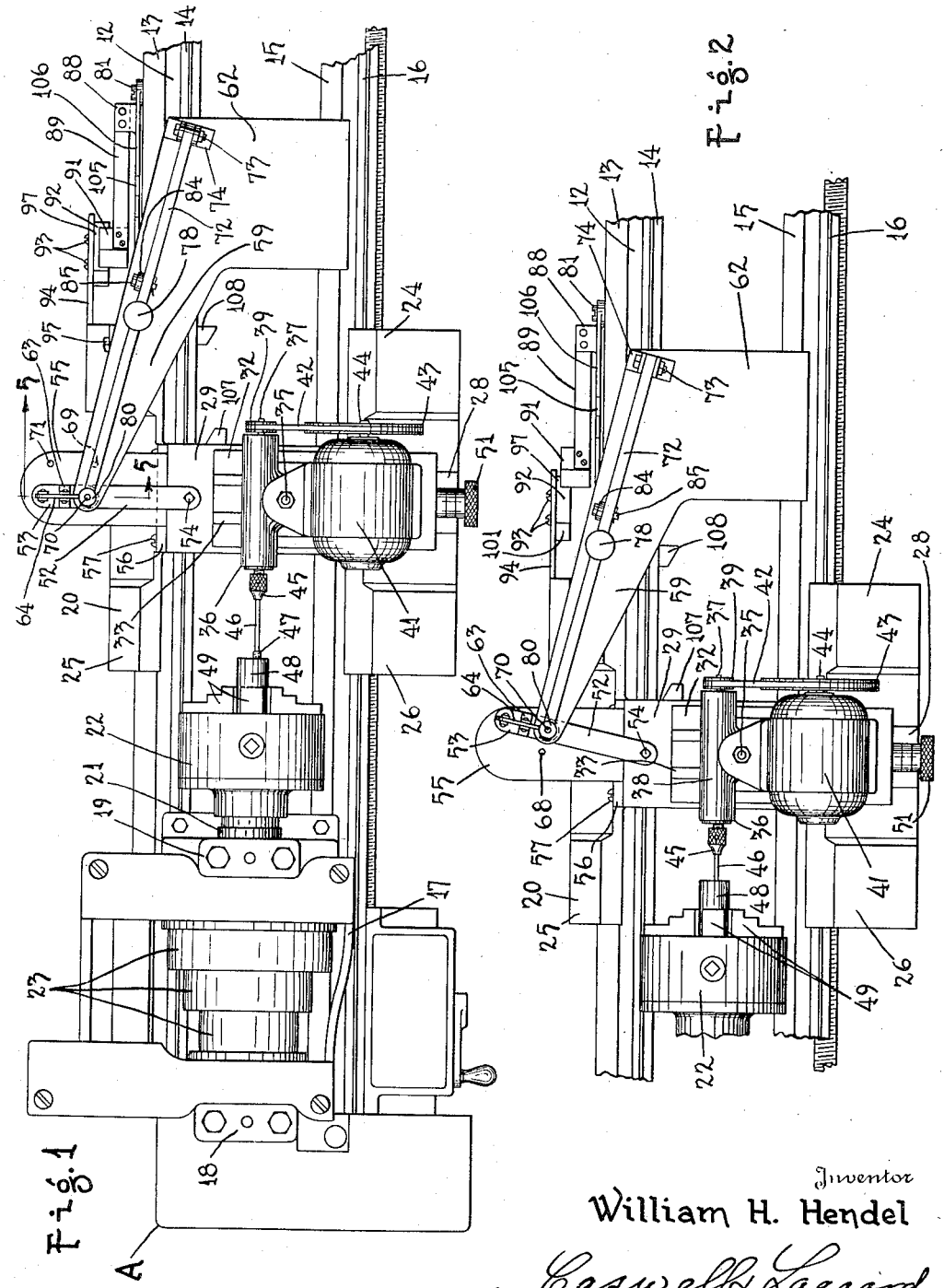
Inventor
William H. Hendel
By Caswell & Lagaard
Attorneys Dec. 12, 1944.  W. H. HENDEL  2,364,977
MACHINE TOOL
Filed Sept. 25, 1942  3 Sheets-Sheet 2

Inventor
William H. Hendel
By Caswell & Lagaard
Attorneys

Dec. 12, 1944.  W. H. HENDEL  2,364,977
MACHINE TOOL
Filed Sept. 25, 1942  3 Sheets-Sheet 3

Inventor
William H. Hendel
By Caswell & Lagaard
Attorneys

Patented Dec. 12, 1944

2,364,977

UNITED STATES PATENT OFFICE 2,364,977

MACHINE TOOL

William H. Hendel, Minneapolis, Minn.

Application September 25, 1942, Serial No. 459,673

20 Claims. (Cl. 51—35)

My invention relates to machine tools and has for an object to provide a machine tool by means of which arcuate cuts may be accurately and positively made on objects of revolution.

Another object of the invention resides in providing a machine tool in which compound curves may be formed on the work.

A still further object of the invention resides in providing a machine tool in which a plurality of curved cuts may be successively made on the work.

An object of the invention resides in providing a machine tool in which both curved and straight cuts may be successively made on the work.

A feature of the invention resides in providing a machine tool in which relative transverse movement between the work and tool is procured to form various contours consisting of curves and straight lines.

A still further object of the invention resides in providing a machine tool in which curves may be formed on the work without the use of templets or forms on which the outline of the surface of the work is originally made.

Another object of the invention resides in providing a machine tool having a work support and a tool support arranged for relative longitudinal and transverse movement and in providing a link pivoted to one of said supports and procuring relative arcuate movement between the supports upon longitudinal relative movement between the supports.

A still further object of the invention resides in providing a second link pivotally connected to the first link and adapted to cause relative arcuate movement between the supports and of a different curvature than that produced by the first link.

An object of the invention resides in providing locking means for holding the parts from predetermined relative movement to procure other predetermined relative movement between the supports.

Other objects of the invention reside in the novel combination and arrangement of parts and in the details of construction hereinafter illustrated and/or described.

In the drawings:

Fig. 1 is a fragmentary plan view of a machine tool illustrating an embodiment of my invention.

Fig. 2 is a view similar to Fig. 1 of a portion of the structure shown therein and illustrating the parts in altered position.

Fig. 3 is a view similar to Fig. 2 showing the parts in still different position.

Fig. 4 is a rear elevational view of a portion of the structure shown in Fig. 1.

Figure 5:
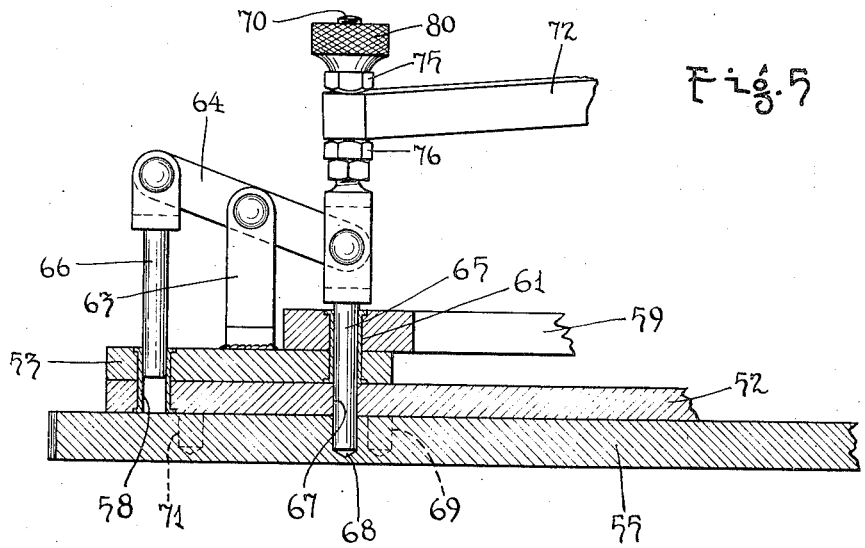
Fig. 5 is a fragmentary elevational sectional view taken on line 5—5 of Fig. 1 and drawn to a greater scale.
Figure 7:
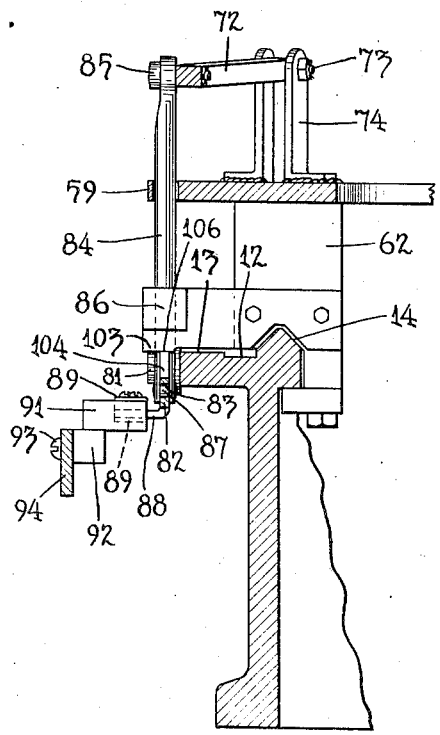
Fig. 7 is a transverse fragmentary sectional view taken on line 7—7 of Fig. 4 and drawn to a greater scale.

In the construction of dies and similar devices, it becomes desirable to construct the same with surfaces of varying contour and frequently such surface may be formed by arcuate curves connected by cylindrical surfaces. The present invention provides a machine tool in which such surfaces may be automatically formed to great precision without the use of templets or similar devices.

For the purpose of illustrating my invention, I have shown in the drawings an ordinary screw-cutting lathe which is indicated in its entirety by the reference letter A. It will, however, be readily comprehended that the invention may be used with grinders or other types of machine tools now suitable for the purpose and that the adaptation shown is merely for the purpose of illustration.

The lathe A consists of a lathe bed 12 having four ways 13, 14, 15 and 16 formed thereon. A head stock 17 is also employed which is mounted on the ways 14 and 15. This head stock includes two bearings 18 and 19 which rotatably support a spindle 21 which is illustrated as having attached to it a scroll chuck 22 for the purpose of supporting the work to be machined. The spindle 21 is driven through a cone pulley 23 which may be back-geared or directly connected to the spindle 21 by means of construction now well known in the art and not shown in detail in the drawings.

Slidably mounted on the ways 13 and 16 is a carriage 20 which has a saddle 24 gibbed to the bed 12 in the customary manner. This saddle is constructed with a longitudinally extending rear member 25 which rests on the way 13 and a longitudinally extending front member 26 which rests on the way 16. These members are connected together by means of a cross member 27 which is constructed with a dove-tailed guide 28 extending transversely of the carriage. Slidably mounted on the guide 28 is a cross-slide 29 which has attached to it a compound rest base 32 adapted to swivel about a pivot not shown. This rest base is formed with a guide 33 which slidably supports the compound rest 34.

Attached to the compound rest 34 by means of a bolt 35 is a grinder 36 which consists of a spindle 37 rotatably mounted in a bearing 38. Spindle 37 has attached to it a pulley 39 which is driven from an electric motor 41 by means of a belt 42. Belt 42 passes over the pulley 39 and over another pulley 43 mounted on the motor shaft 44. The bearing 38 and the motor 41 are both supported on the compound rest 34 and are jointly movable with it. Mounted on the end of the spindle 37 is a chuck 45 in which is secured a shank 46 carrying a grinding wheel 47. This wheel serves to machine the work, which, in the instant case, is illustrated as a die 48 which is held between the jaws of the chuck 22. The cross feed screw for the cross slide 29 is removed in the adaptation of the invention to the lathe, while the compound rest feed screw 51 is used to move the compound rest to procure depth of cut.

Figure 6:
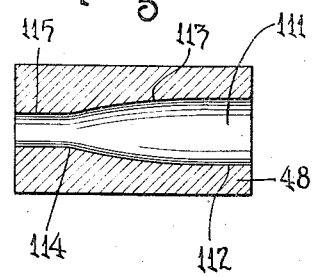
Fig. 6 is a longitudinal sectional view of the work being worked on by the machine.

The die 48 which is a specimen of the kind of work adapted to be machined by my invention is best shown in Fig. 6. This die is in the nature of an object of revolution having a bore 111 extending therethrough. This bore has a cylindrical surface at the outermost end indicated at 112 which is connected to a curved surface 113. The surface 113 joins with another curved surface 114 forming therewith a reverse curve. The surface 114 is tangent to a cylindrical surface 115 of lesser diameter than the surface 112.

The invention proper includes two links 52 and 53. The link 52 is pivoted by means of a stud 54 to the cross-slide 29. This link extends rearwardly of the cross-slide and overlies a plate 55. Plate 55 is provided with a flange 56 which is attached to the end of the cross slide 29 by means of screws 57. The link 52 is pivoted to the link 53 by means of a flanged bushing 58 which extends jointly through the ends of both of the links 52 and 53, best shown in Fig. 5. The link 53 is pivoted to an arm 59 by means of a similar bushing 61 which extends jointly through said parts. The arm 59 extends outwardly from a sliding mounting 62 which is slidably mounted on the two ways 14 and 15 and which is gibbed to the bed 12 in the same manner as the carriage 20. The mounting 62 may move longitudinally of the bed 12 but the said mounting and the arm 59 will be restrained from transverse movement by means of the way 14.

The links 52 and 53 may be locked together and the same may be locked to the plate 55. This is accomplished by the construction best shown in Figs. 1 and 5. Extending upwardly from the link 53 intermediate the ends thereof is an upright 63, to which is pivoted a locking lever 64. Lever 64 has pivoted to the ends thereof two plungers 65 and 66 which are slidable in the two bores of the bushings 61 and 58. The plungers 65 and 66 fit snugly within the bores of the said bushing, but are loosely connected to the lever 64, so that swinging movement of said lever will cause parallel, vertical, reciprocation of the plungers in opposite directions. The plunger 65 is adapted to enter a hole 67 in the link 52 and upon further movement, to enter either of two holes 68 and 69 in the plate 55. Plunger 66 is similarly adapted to enter a hole 71 in the plate 55. When the lever 64 is swung in one direction, the links 52 and 53 may be locked together and when swung further in the same direction, the locked links may be locked relative to the plate 55 in either of the two positions determined by the holes 68 and 69. Similarly, when the lever 64 is rocked in the other direction, the link 52 will become disengaged from the link 53 and the said link 52 locked to the plate 55 through the hole 71.

For swinging the lever 64, another lever 72 is employed which extends along the arm 59. This lever is pivoted at 73 to a lug 74 formed on the mounting 62. Lever 72, at its outermost end, is pivoted to an extension 70 formed on the plunger 65. Said lever is held in position on the extension 70 of said plunger 65 by means of two nuts 75 and 76 which are screwed thereon and which hold the lever 72 in adjusted position. A knob 80, screwed on the end of extension 70, serves as a lock nut for the nut 75. When the lever 72 is swung about its pivot 73, the plunger 65 is raised and lowered and the lever 64 swung accordingly. The lever 72 is urged into its downward position by means of a compression coil spring 77. This spring is seated on the upper surface of the lever and is further seated against the head 78 of a screw 79. The screw 79 passes through the lever 72 and is threaded into the arm 59 of the mounting 62.

For moving the lever 72, the construction shown in Fig. 4 is employed. Pivoted to the lathe bed 12 by means of a stud 81 is a swinging arm 82. This arm has formed in it a horizontally extending slot 83. A plunger 84 is pivoted to the lever 72 by means of a pintle 85 and extends downwardly through a guide 86 secured to the mounting 62. The said plunger has a pin 87 on it which is slidably mounted in the slot 83. Upon swinging of the arm 82, the plunger 84 is raised and lowered, causing a corresponding swinging of the lever 72. The arm 82 has attached to it a bracket 88 which projects outwardly therefrom. This bracket has secured to it a leaf spring 89 which extends in the direction of extent of the arm 82 and, when unsprung, lies substantially parallel with it. This spring has mounted on the end of it a cam follower 91 which is adapted to engage a cam 92. Cam 92 is secured by means of screws 93 to a bracket 94 which is attached to the rear member 25 of the saddle 24 of carriage 20 by means of screws 95. The cam follower 91 is offset with reference to the spring 89 which clears the cam 92 and permits the said follower to engage the various cam surfaces thereof. The cam 92 is formed with an upper cam surface 97, a lower cam surface 98 and two oblique end cam surfaces 99 and 101.

The mounting 62 may be held in locked position with reference to the bed 12 by means of the arm 82. For this purpose, a latch lug 103 is employed which is attached to said mounting and which extends over the upper edge of the arm 82. In this arm are formed two notches 104 and 105. The notch 104 is relatively narrow and snugly receives the latch lug 103 and holds the mounting 62 from movement in either direction. The notch 105 is somewhat wider and limits the movement of the said mounting.

In the movement of the cross-slide and linkage back to normal position, movement of the cross-slide is reversed. To take up the slack thus occasioned, two wedges 107 and 108 are employed, the wedge 107 being secured to the cross-slide and the wedge 108 to the bed 12. These wedges act when the carriage is moved in its extreme position away from the work and prior to engagement of the grinding wheel with the work.

The operation of the invention is as follows: The die 48 is first rough machined, as by a reamer, and then hardened and tempered. The die so formed is then inserted in the chuck 22 and clamped in position by the jaws 49 thereof. At the beginning of the machining operation, the parts are arranged as shown in Fig. 1 and Fig. 4, with the grinding wheel 47 just about to enter the bore 111 of the die 48.

The latch lug 103 rides upon the upper edge or surface 106 of the arm 82 between the two notches 104 and 105. Arm 82 is urged into engagement with this latch lug by means of the spring 89 which is flexed, due to the follower 91 resting upon the cam 92. This spring is sufficiently stiff to overcome the action of spring 77 which urges the parts in the opposite direction. With the parts so arranged, the plunger 84 is in its lowermost position. When in such position, the plunger 65 extends through both the links 52 and 53 into the hole 68 in the plate 55, while the lower end of the plunger 66 is in a midway position within the bushing 58. This prevents relative movement between the cross-slide 29 and the mounting 62, both in a longitudinal and transverse direction. Upon setting the lathe and the grinder in motion, the carriage 20 may now be moved toward the chuck 22, either manually or by means of the lathe lead screw, the mounting 62 traveling with it. The longitudinal movement of the carriage 20 causes the grinding wheel 47 to enter the work and cut the cylindrical portion 112 of the bore 111. Throughout this movement, the latch lug 103 rides upon the upper surface 106 of the arm 82. When the latch lug 103 is received within the notch 104, the arm 82, through the action of spring 89 is raised and the plunger 84 moved upwardly. This movement terminates before the latch lug 103 reaches the bottom of the notch 104. Such movement is terminated by the end of the plunger 66 striking the plate 55. The plunger 65 is now free from the plate 55, but is still engaged within the hole 67 of link 52, locking the two links 52 and 53 together. As the carriage 20 continues its longitudinal movement, the mounting 62 now being latched relative to the bed 12, causes the linkage to swing about the bushing 61 as a pivot. Link 52, being pivoted to the cross slide 29, forces the cross slide to move with it. The carriage and the linkage hence move from the position shown in Fig. 1 to that shown in Fig. 2. Such movement causes arcuate movement between the grinding wheel 47 and the work, and the curved portion 113 of bore 111 is cut. During such movement, the spring 89 exerts an upward pressure on the arm 82, plunger 84 and lever 72 which tends to urge the plunger 66 downwardly. When plunger 66 reaches hole 71, the same drops into this hole and locks the link 52 from movement relative to the plate 55. During such movement, the latch 103 reaches the bottom of the notch 104. At the same time, the plunger 65 is raised sufficiently to clear the link 52, permitting relative movement between the two links. Continued longitudinal movement of the carriage now causes the link 53 to swing about the bushing 61 as a pivot, the said link being momentarily pivoted to the plate 55 through the hole 71 and the plunger 66 received therein. The grinding wheel 47 now makes a reverse curve and cuts the portion 114 of the bore 111. During such movement of the carriage, the carriage and the linkage move relative to one another from the position shown in Fig. 2 to that shown in Fig. 3. At the end of the curved portion 114 of the bore 111, the follower 91 passes the end of the surface 97 of cam 92 and through the action of spring 89, drops. Spring 77, being now free to act, now forces the lever 72 downwardly, which lowers the plunger 65 and raises the plunger 66. The plunger 65 passes through a hole in the link 52 similar to the hole 67, not shown, and into a hole 69 in the plate 55. At the same time, the plunger 66 is disengaged from the hole 71. This again locks the mounting 62 and the cross slide 29 from both longitudinal and transverse relative movement. Upon the follower 91 dropping off from the cam 92, the latch lug 103 is freed from the notch 104 and the mounting 62 is again free to travel with the carriage. During such movement, the cylindrical portion 115 of the bore 111 is cut. It will thus be seen that continuous movement of the carriage 20 toward the chuck 22 produces successively the various cuts forming the bore of the die, without manipulating the cross-slide. In this manner, the change from one curve to the other is made automatically and instantly, at the proper time, so that the finished cut is smooth and without ridges at the changes of curvature.

When the cut has been completed, the grinding wheel 47 is released from the work through the feed screw 51 and the carriage 20 manually moved in a direction away from the work. Such movement is continued until the follower 91 passes beneath the surfaces 99 and 98 of the cam 92. After the follower 91 has cleared the cam 92, the return movement of the carriage is continued. At the same time, knob 80 on plunger 65 is raised manually a sufficient distance to disengage plunger 65 from hole 69 and from link 52. Such movement, of course, causes plunger 66 to engage hole 71 and also causes latch lug 103 to enter the notch 105, thus locking the mounting 62 from reverse movement. Continued reverse movement of the carriage causes the linkage to move back to position similar to that shown in Fig. 2. As soon as the linkage has commenced to move so that the plunger 65 has cleared the hole in link 52 in which it was engaged, knob 80 is released and plunger 65 urged downwardly by the spring 77. When the carriage reaches a position in which the links 52 and 53 are again in alignment similar to their position in Fig. 2, the plunger 65 drops into hole 67 in link 52 and rides upon the surface of the plate 55. This disengages the plunger 66 from engagement with hole 71 and the links may move in unison until they occupy a position similar to that shown in Fig. 1. During such movement, the latch 103 still remains in engagement with lever 82 at notch 105, said lever having moved half way down. Reverse movement of the carriage is still continued. When the plunger 65 reaches hole 68, the pressure from spring 77 causes said plunger to enter said hole and the linkage then is arranged similar to the arrangement shown in Fig. 1. Further rearward movement of the carriage causes the wedge 107 to engage the wedge 108 and to take up the slack in the linkage. The carriage 20 is then moved toward the work. This causes the follower 91 to engage the surface 101 of cam 92 and to travel up said surface and on to the surface 97. When the carriage reaches its starting position, as shown in Fig. 1, the latch lug 103 engages the upper surface 106 of arm 82 and holds the parts in proper position. The grinding wheel 47 is next moved into contact with the work through the feed screw 51 and the device is ready to take another cut.

The advantages of my invention are manifest. The human element does not enter into the formation of the curved surface which is accomplished positively and automatically. By the proper designing of the linkage, any arrangement of curved and cylindrical surfaces may be made within the capacity of the device. With my invention, the change from one curve to the other is made rapidly and without stopping the machinery, so that no marks or ridges are formed at the change of curvature. The device is extremely simple in construction and positive in operation. My invention may be applied to existing lathes or grinders without material change thereof. The invention may be built at a minimum expense. With my invention, highly accurate results are produced.

Changes in the specific form of my invention, as herein described, may be made within the scope of what is claimed without departing from the spirit of my invention.

Having described my invention, what I claim as new and desire to protect by Letters Patent is:

1. In combination, a bed, a carriage, longitudinal guide means for guiding said carriage for longitudinal movement relative to the bed, a work support, a tool support, one of said supports being carried by the carriage and the other of said supports being carried by the bed, transverse guide means for guiding one of said supports for transverse movement relative to the other support, a link, pivot means for pivoting said link at one locality to a part movable with said transversely movable support, pivot means for pivoting said link at another locality, means for restraining transverse movement of said second named pivot means and means operated by the longitudinal movement of the carriage for swinging said link.

2. In combination, a bed, a carriage, longitudinal guide means for guiding said carriage for longitudinal movement relative to the bed, a work support, a tool support, one of said supports being carried by the carriage and the other of said supports being carried by the bed, transverse guide means for guiding one of said supports for transverse movement relative to the other support, a link, pivot means for pivoting said link at one locality to a part movable with said transversely movable support, pivot means for pivoting said link at another locality, means for restraining transverse movement of said second named pivot means, means operated by the longitudinal movement of the carriage for swinging said link, and means for rendering said last named means inoperative.

3. In combination, a bed, a carriage, longitudinal guide means for guiding said carriage for longitudinal movement relative to the bed, a work support, a tool support, one of said supports being carried by the carriage and the other of said supports being carried by the bed, transverse guide means for guiding one of said supports for transverse movement relative to the other support, a link, pivot means for pivoting said link to a part movable with said transversely movable support, pivot means for pivoting said link to a part held from transverse movement relative to said bed for procuring arcuate relative movement between the work support and the tool support upon longitudinal movement of the carriage, and means for restraining movement of said link to prevent relative transverse movement between the tool support and work support.

4. In combination, a bed, a carriage, longitudinal guide means for guiding said carriage for longitudinal movement relative to the bed, a work support, a tool support, one of said supports being carried by the carriage and the other of said supports being carried by the bed, transverse guide means for guiding one of said supports for transverse movement relative to the other support, a link, means for connecting said link to a part movable with said transversly movable support and to a part held from transverse movement relative to the bed, to procure arcuate relative movement between the work support and the tool support, a second link, means for connecting said second link with a part movable with said transversely movable support and with a part held from transverse movement relative to the bed for procuring other arcuate relative movement between the work support and the tool support, and means for rendering one of said links inoperative upon operation of the other of said links.

5. In combination, a bed, a carriage, longitudinal guide means for guiding said carriage for longitudinal movement relative to the bed, a work support, a tool support, one of said supports being carried by the carriage and the other of said supports being carried by the bed, transverse guide means for guiding one of said supports for transverse movement relative to the other support, a pair of links pivoted together, pivot means for pivoting one of said links to a part movable with said transversely movable support, pivot means for pivoting the other of said links to a part immovable transversely of the bed, and means for successively swinging said links to procure successive arcuate movement of the transversely movable support about different centers.

6. In combination, a bed, a carriage, longitudinal guide means for guiding said carriage for longitudinal movement relative to the bed, a work support, a tool support, one of said supports being carried by the carriage and the other of said supports being carried by the bed, transverse guide means for guiding one of said supports for transverse movement relative to the other support, a pair of links pivoted together, means for pivoting one of said links to a part movable with said transversely movable support, pivot means for pivoting the other of said links to a part immovable transversely of the bed, means for locking said links from relative swinging movement and means for swinging the link assembly upon longitudinal movement of the carriage.

7. In combination, a bed, a carriage, longitudinal guide means for guiding said carriage for longitudinal movement relative to the bed, a work support, a tool support, one of said supports being carried by the carriage and the other of said supports being carried by the bed, transverse guide means carried by the carriage and guiding one of said supports for transverse movement relative to the other support, a link pivoted to a part movable with said transversely movable support, a second link pivoted to said first link and to a part held from transverse movement relative to the bed, means for restraining relative swinging movement between said links, means for restraining relative longitudinal movement of the first named link at its locality of connection to the second named link.

8. In combination, a bed, a carriage, longitudinal guide means for guiding said carriage for longitudinal movement relative to the bed, a work support, a tool support, one of said supports being carried by the carriage and the other of said supports being carried by the bed, transverse guide means carried by the carriage and guiding one of said supports for transverse movement relative to the other support, a link, pivot means between one end of said link and a part movable with said transversely movable support, a member slidable along said bed, pivot means for pivoting said link at another locality to said member, means for locking said member from movement relative to the bed and means for locking said member from movement relative to said carriage.

9. In combination, a bed, a carriage, longitudinal guide means for guiding said carriage for longitudinal movement relative to the bed, a work support, a tool support, one of said supports being carried by the carriage and the other of said supports being carried by the bed, transverse guide means carried by the carriage and guiding one of said supports for transverse movement relative to the other support, a link, pivot means between one end of said link and a part movable with said transversely movable support, a member slidable along said bed, a second link, pivot means for pivoting said second link to said first link, pivot means for pivoting said second link to said member, locking means for locking said links from relative movement, locking means for locking said first named link from swinging movement relative to said carriage, locking means for locking said member from movement relative to the bed and locking means for locking said member from movement relative to said carriage.

10. In combination, a bed, a carriage, longitudinal guide means for guiding said carriage for longitudinal movement relative to the bed, a work support, a tool support, one of said supports being carried by the carriage and the other of said supports being carried by the bed, transverse guide means carried by the carriage and guiding one of said supports for transverse movement relative to the other support, a link, pivot means between one end of said link and a part movable with said transversely movable support, a member slidable along said bed, a second link, pivot means for pivoting said second link to said first link, pivot means for pivoting said second link to said member, locking means for locking said links from relative movement, locking means for locking said first named link from swinging movement relative to said carriage, locking means for locking said member from movement relative to the bed, locking means for locking said member from movement relative to said carriage, and means for operating said locking means in predetermined order.

11. In combination, a bed, a carriage, longitudinal guide means for guiding said carriage for longitudinal movement relative to the bed, a work support, a tool support, one of said supports being carried by the carriage and the other of said supports being carried by the bed, transverse guide means carried by the carriage and guiding one of said supports for transverse movement relative to the other support, a link, pivot means between one end of said link and a part movable with said transversely movable support, a member slidable along said bed, a second link, pivot means for pivoting said second link to said first link, pivot means for pivoting said second link to said member, locking means for locking said links from relative movement, locking means for locking said first named link from swinging movement relative to said carriage, locking means for locking said member from movement relative to the bed, locking means for locking said member from movement relative to said carriage and means operating upon longitudinal movement of the carriage for operating said locking means in predetermined order.

12. In combination, a bed, a carriage, longitudinal guide means for guiding said carriage for longitudinal movement relative to the bed, a work support, a tool support, one of said supports being carried by the carriage and the other of said supports being carried by the bed, transverse guide means for guiding one of said supports for transverse movement relative to the other support, means operable upon movement of the carriage toward the other support for procuring relative transverse movement between the work support and tool support, means movable upon reverse movement of the carriage to procure reverse transverse movement between the work support and the tool support and means operable at the end of the reverse movement of the carriage for taking up the slack occasioned in the reverse transverse movement between the work support and the tool support.

13. In combination, a bed, a carriage, longitudinal guide means for guiding said carriage for longitudinal movement relative to the bed, a work support, a tool support, one of said supports being carried by the carriage and the other of said supports being carried by the bed, transverse guide means for guiding one of said supports for transverse movement relative to the other support, a link for moving said transversely movable support, pivot means for pivoting said link at one locality to a part movable with said transversely movable support, pivot means for pivoting said link at another locality and means operated on occasion through movement of the carriage for locking said link from movement.

14. In combination, a bed, a carriage, longitudinal guide means for guiding said carriage for longitudinal movement relative to the bed, a work support, a tool support, one of said supports being carried by the carriage and the other of said supports being carried by the bed, transverse guide means for guiding one of said supports for transverse movement relative to the other support, means for moving said transversely movable support transversely, means for locking said transversely movable support from transverse movement and means operated through longitudinal movement of the carriage for controlling the operation of said last two means.

15. In combination, a bed, a carriage, longitudinal guide means for guiding said carriage for longitudinal movement relative to the bed, a work support, a tool support, one of said supports being carried by the carriage and the other of said supports being carried by the bed, transverse guide means for guiding one of said supports for transverse movement relative to the other support, a link for moving said transversely movable support, pivot means for pivoting said link at one locality to a part movable with said transversely movable support, pivot means for pivoting said link at another locality, means operated through longitudinal movement of the carriage throughout a portion of the movement thereof for swinging said link and means operated throughout another portion of the movement of said carriage for restraining said link from movement.

16. In combination, a bed, a carriage, longitudinal guide means for guiding said carriage for longitudinal movement relative to the bed, a work support, a tool support, one of said supports being carried by the carriage and the other of said supports being carried by the bed, transverse guide means for guiding one of said supports for transverse movement relative to the other support, a link, pivot means for pivoting said link at one locality to a part movable with said transversely movable support, pivot means for pivoting said link at another locality, means for guiding said last named pivot means for movement in a direction differing from the direction of movement of said transversely movable support and means operable on occasion for restraining said last named pivot means for movement in such direction.

17. In combination, a bed, a carriage, longitudinal guide means for guiding said carriage for longitudinal movement relative to the bed, a work support, a tool support, one of said supports being carried by the carriage and the other of said supports being carried by the bed, transverse guide means for guiding one of said supports for transverse movement relative to the other support, a link for moving said transversely movable support, pivot means for pivoting said link at one locality to a part movable with said transversely movable support, a second link pivoted to said first link, pivot means for said second link and means operable on occasion for holding said second named pivot means fixed relative to the carriage.

18. In combination, a bed, a carriage, longitudinal guide means for guiding said carriage for longitudinal movement relative to the bed, a work support, a tool support, one of said supports being carried by the carriage and the other of said supports being carried by the bed, transverse guide means for guiding one of said supports for transverse movement relative to the other support, a link for moving said transversely movable support, pivot means for pivoting said link at one locality to a part movable with said transversely movable support, a second link pivoted to said first link, pivot means for said second link and means operable on occasion for holding said links from relative movement.

19. In combination, a bed, a carriage, longitudinal guide means for guiding said carriage for longitudinal movement relative to the bed, a work support, a tool support, one of said supports being carried by the carriage and the other of said supports being carried by the bed, transverse guide means for guiding one of said supports for transverse movement relative to the other support, a link, pivot means for pivoting said link at one locality to a part movable with said transversely movable support, a second link of different length than said first link, means for pivoting said second link at one end to a part movable with said transversely movable support, means for pivoting said links at other localities to a part fixed relative to the bed, and means for rendering either of said links operable to move said transversely movable support.

20. In combination, a bed, a carriage, longitudinal guide means for guiding said carriage for longitudinal movement relative to the bed, a work support, a tool support, one of said supports being carried by the carriage and the other of said supports being carried by the bed, transverse guide means for guiding one of said supports for transverse movement relative to the other support, a link, pivot means for pivoting said link at one locality to a part movable with said transversely movable support, a second link extending in the opposite direction from the first link, means for pivoting said second link at one end to a part movable with said transversely movable support, means for pivoting said links at other localities to a part fixed relative to the bed, and means for rendering either of said links operable to move said transversely movable support.

WILLIAM H. HENDEL.